Aug. 25, 1964  A. W. LOCKWOOD ETAL  3,145,392
METHOD OF MAKING COLLARS FOR SHIRTS
Filed March 19, 1962  2 Sheets-Sheet 2

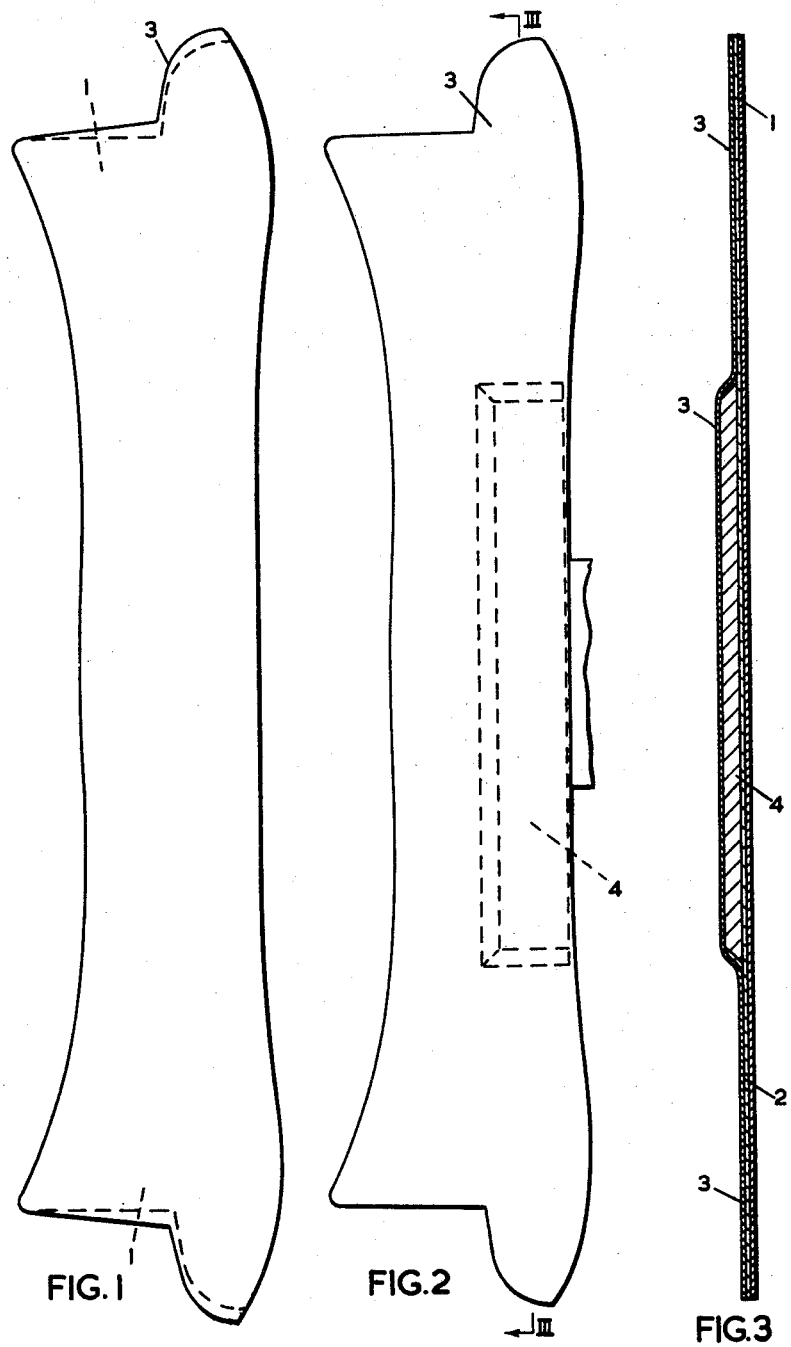

INVENTORS
ARTHUR WILLIAM LOCKWOOD
LAJOS BIHALY
BY Hann and Ndink
ATTORNEYS

United States Patent Office 3,145,392
Patented Aug. 25, 1964

3,145,392
METHOD OF MAKING COLLARS FOR SHIRTS
Arthur William Lockwood and Lajos Bihaly, London, England, assignors to Trubenised Company (registered trust)
Filed Mar. 19, 1962, Ser. No. 180,760
Claims priority, application Great Britain Apr. 27, 1961
3 Claims. (Cl. 2—143)

In the network at present employed for making one-piece, multiple-ply turndown collars for shirts and like garments, the constituent plies are stitched together while superimposed on one another in flat condition. All the plies of the collar consequently contain equal lengths of fabric and the finished collar can be laid flat without stretching or wrinkling any of the plies. However, when the collar is curved into closed condition, as in wear, the outermost ply (i.e. the ply lying furthest from the neck of the wearer) necessarily assumes a greater overall length than the innermost ply (i.e. the ply nearest to the neck), with the result that the outermost ply becomes stretched and/or the innermost ply becomes wrinkled.

Collars according to the present invention have, in at least one of the two parts of the collar which lie on opposite sides of the foldline (namely the collar top and the band), plies which contain different lengths of material, the ply which will be outermost when in wear being longer than the ply which will be innermost.

In the collar top the face ply is outermost and the back ply innermost, but in the band of the collar the face ply is innermost and the back ply outermost. Ideally, therefore, the collar top portion of the face ply should contain a greater length of material than the corresponding portion of the back ply, while the band portion of the face ply should contain a lesser length of material than the corresponding portion of the back ply. Ideally, also, the lengths of material included in the several plies of the collar should increase progressively from innermost to outermost, the lining ply of the usual three ply collar having a length intermediate those of the face and back plies.

While such an "ideal" collar can be made, its manufacture presents practical difficulties. It has been found by experiment that satisfactory results are obtained if the lining ply is made equal in length to the face ply, the back ply only being of different length. It has also been found by experiment that the improvement in the appearance of the collar when curved as in wear which can be obtained by the use of plies of different lengths is considerably more marked in the band portion of the collar than it is in the collar top, so that a collar of substantially improved appearance can be obtained by including an excess length of material in the band portion of the ply which will be outermost in the band, namely the back ply.

A particular and at present preferred manner of carrying the invention into effect is described below with reference to the accompanying drawing, in which:

FIGURE 1 is a plan view of collar blanks superimposed on one another in flat condition;

FIGURE 2 is a similar view of the same blanks with their peripheries brought into register by the interposition of a spacer member between the blanks;

FIGURE 3 is a sectional view taken on the line III—III of FIGURE 2;

Figure 4:
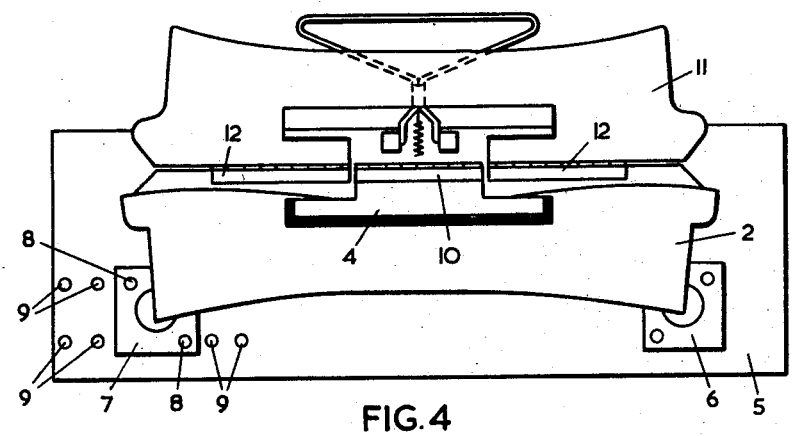
FIGURE 4 is a view from above of a work holding device with collar blanks in position therein.

In the illustrated embodiment of the invention, the face ply and lining are made from blanks having the form shown at 1 in FIGURE 1, while the back ply is made from a blank having the form shown at 3, the back ply blank having a band portion of greater length than the corresponding portions of the other two plies. As shown in FIGURES 2 and 3, by interposing a suitably shaped spacer member 4 between the band portion of the back ply blank 3 and the band portions of the other two blanks, the peripheries of the three blanks can be brought into register with one another, the excess length of material in the band of the back ply 3 being absorbed by the humping of this ply over the spacer while the lining ply 1 and face ply 2 lie flat. While held in this condition, the three plies can be joined together by the application of a running stitch extending around the major part of the contour of the required collar.

Figure 5:
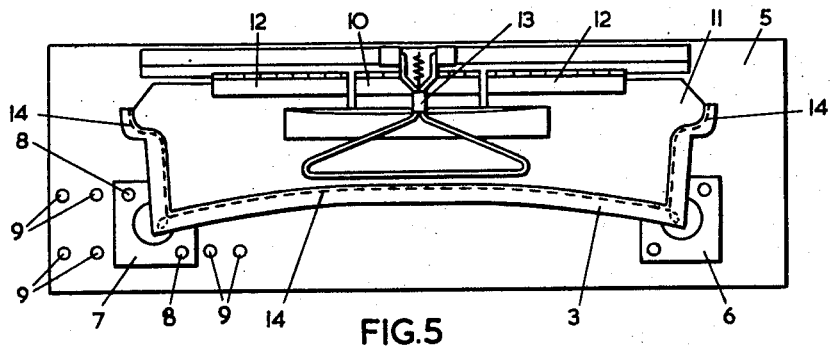
FIGURE 5 is a similar view of the same device at a later stage of operation.

FIGURES 4 and 5 show a work holding device for holding the plies during the application of the running stitch. It comprises a base plate 5 which carries a fixed locating member 6 adapted to be engaged by one of the point portions of the collar blanks and a second locating member 7 for engagement by the opposite point portions the member 7 being adjustable in position to suit blanks for collars of different sizes by engaging pins 8 on the locating member in selected ones of a series of holes 9 in the base plate. A spacer member 4 is hinged at 10 to the base plate and a clamping plate 11, which is cut away to clear the spacer 4, is mounted on hinges 12, coaxial with the hinge 10. A clamping spring 13 is adapted to act upon the plate 11 and press it towards the base plate 5.

With parts 4 and 11, raised clear of the base plate 5, the blanks 1 and 2 for the lining and face ply are laid in superimposition with one another upon the flat top surface of the base plate, their point portions being engaged with the locating members 6 and 7 to position the blanks correctly. Spacer member 4 is then turned down about its hinge, as shown in FIGURE 4, to overlie the central portion of the band portion of the blanks. The blank 3 for the back ply is then laid over the spacer member 4 and the part of the face ply left exposed by member 4, its points also being engaged with the locating members 6 and 7. Clamping plate 11 is then turned down upon its hinge and clamping spring 13 is operated to press plate 11 towards base plate 5. Clamping plate 11 engages the major part of the surface of the back ply blank 3, leaving exposed the portion which is humped over the space 4 and also a narrow marginal portion, and holds it flat against the other two blanks.

The work holder is then loaded into an automatically operating sewing machine, which forms a running stitch 14 in the exposed marginal portion of the blanks, uniting them along the major portion of the contour of the required collar. After formation of the running stitch, spring 13 and clamping plate 11 are raised and the collar assembly composed of the three united blanks is withdrawn from the spacer member. The assembly is then turned in the usual way and manufacture of the collar completed.

It will be appreciated that as a result of the steps described the band portion of the back ply contains excess material relative to the corresponding part of the other two plies. To hold this excess material evenly distributed along the length of the collar, a line of stitching is applied through the band portions of all three plies at a position adjacent the foldline of the collar, this stitching being applied while the collar is held curved or rounded to a radius corresponding to the difference between the lengths of the innermost and outermost plies.

Figure 6:
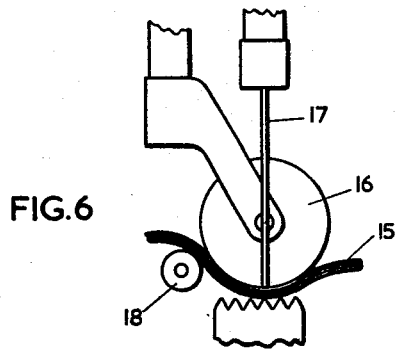
FIGURE 6 is a fragmentary side view of part of a sewing machine used in the production of a collar.

To obtain correct stitching it is only necessary that the collar should be held curved to the required radius for a short distance after passing the needle of the machine which applies the line of stitching. A suitable arrangement is shown in FIGURE 6. The collar 15 is stitched at the position described by a sewing machine in which the usual presser foot is replaced by a roller 16. After passing the needle 17 of the machine, the collar is held against the periphery of roller 16 for a short distance by means such as the roller 18.

As an alternative to the apparatus and procedure described above, use may be made of a work holder generally similar to that described and illustrated in Patent No. 2,768,592, this work holder comprising a pair of end pieces which are movable towards and away from one another and each carry a row of pins on which the end collar blanks can be impaled at positions outside the line of the running stitch. Blanks of different lengths may be loaded onto such a work holder and the end pieces then moved apart to take up the slack in the longer blanks, the shorter blanks being correspondingly stretched. With this arrangement all the blanks may be of different lengths. Moreover, it is possible to accommodate blanks one of which (for the face ply) is of increased length in the collar top portion and another (for the back ply) is of increased length in the band portion.

We claim:

1. A method of making a one-piece, multiple-ply turn down collar for shirts and like garments which comprises the steps of supporting in flat condition a lining blank and a face ply blank superimposed on the lining blank, each of said blanks including a top portion and a band portion, positioning a spacer member on the band portion of the face ply blank intermediate the ends thereof while leaving the remainder of the face ply blank exposed, laying a back ply blank over the face ply blank and the spacer member, said back ply blank including a top portion and a band portion which contains a greater length of material than the back portions of the lining and face ply blanks, clamping the back ply blank against the exposed parts of the face ply blank to hold the back ply blank humped over the spacer member, stitching the clamped blanks together around a major part of the periphery of the collar, removing the spacer member from the assembly thus formed, turning the assembly, and stitching together the constituent plies of the turned assembly at a position adjacent the foldline of the collar while holding the collar curved as in wear.

2. A method of making a one-piece, multiply ply, turned down collar for shirts and like garments, which comprises the steps of assembling the collar plies in superimposition with a spacer member interposed between the plies; clamping the plies together outside the area covered by the spacer, with one of the outer collar plies flat and the other outer collar ply bent round the spacer; while the plies are so clamped, securing them together by stitching which includes end portions adjacent the two end edges of the plies, whereby one outer collar ply includes between the said end portions of the stitches a greater length of fabric than does the other outer collar ply; removing the spacer member from between the plies; and turning and finishing the assembly.

3. A method of making a collar in accordance with claim 2 and comprising the additional step of stitching the plies together adjacent the foldline after the assembly has been turned and while at least the part of the collar being stitched is held curved as in wear.

References Cited in the file of this patent

UNITED STATES PATENTS

| 2,639,843 | Liebowitz | May 26, 1953 |
| 2,651,043 | McCreery | Sept. 8, 1953 |
| 2,681,450 | Adams | June 22, 1954 |
| 2,705,582 | Liebowitz | Apr. 5, 1955 |

FOREIGN PATENTS

| 1,192,526 | France | Oct. 27, 1959 |